March 15, 1927.  1,621,371
A. KÉGRESSE
REMOVABLE CREEPER FOR TRACTOR BELTS
Filed Aug. 14, 1924
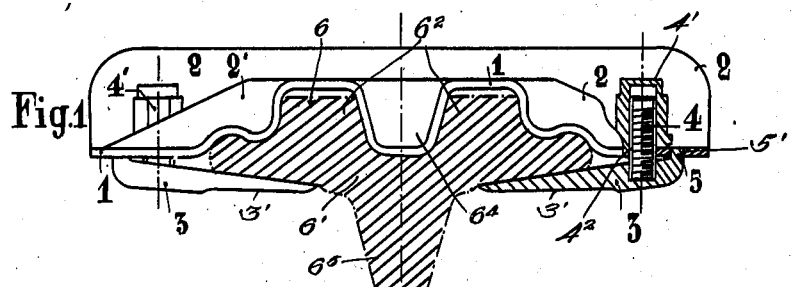
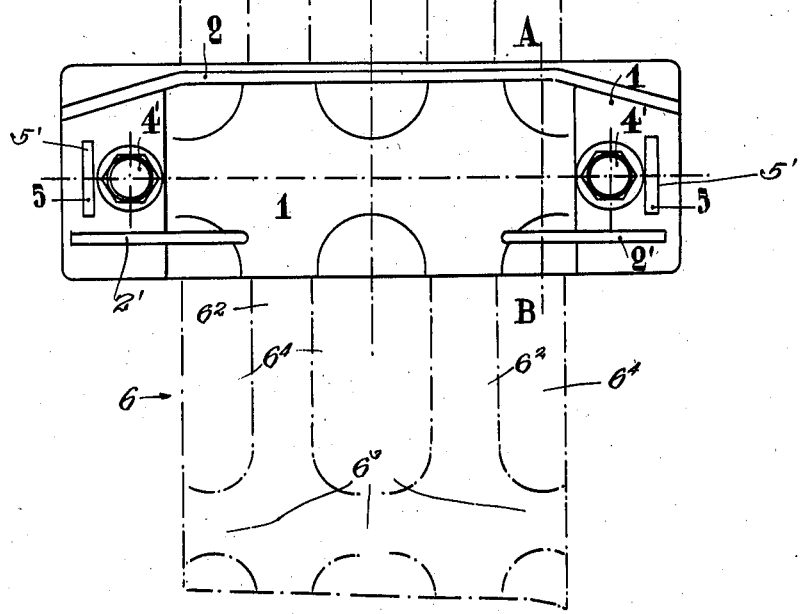
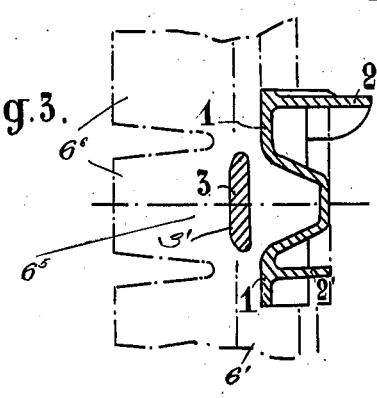
INVENTOR:
Adolphe Kégresse
BY
ATTORNEY Patented Mar. 15, 1927.

1,621,371

UNITED STATES PATENT OFFICE.

ADOLPHE KÉGRESSE, OF PARIS, FRANCE.

REMOVABLE CREEPER FOR TRACTOR BELTS.

Application filed August 14, 1924, Serial No. 732,093, and in France September 22, 1923.

With vehicles propelled by endless track belts the practice, in order to increase the grip on slippery grounds, is to use creepers or spikes secured by means of bolts or screws directly to the belts themselves.

In order to be fitted with such creepers, belts made of some tough material, of rubberized fabric for instance, require to be formed with holes for the bolts and these holes are impractical owing to the serious drawbacks which they involve: weakening of the tread, inadequate durability of the material serving as the tread of the belt etc.

The object of my invention is to provide a creeper device for tough treads of mechanical vehicles and, in order to make my invention more clearly understood, I have illustrated, as an example, an embodiment thereof in and by a drawing appended hereto and wherein:

Figure 1 is a side elevation of the invention applied to a tractor belt, the latter being shown in section;

Fig. 2 is a top plan view of Fig. 1, but with the belt shown in dotted lines; and Fig. 3 is a section taken on the line A—B of Fig. 2, and likewise showing the belt in dotted lines.

The tractor belt to which the creeper is to be applied may be of any preferred form. In the present instance, the one illustrated, and which is indicated generally by the numeral 6, comprises a continuous tread portion 6' which is provided on its outer face with spaced longitudinal ground-engaging ribs 6² and connecting portions 6³, and with hollows 6⁴ between said ribs; the inner face of the aforesaid tread portion 6' being formed with a continuous median guide rib 6⁵ which is itself split transversely at intervals to form blocks or members 6⁶ (Fig. 3). But it is to be understood, however, that the belt itself forms no part whatever of my invention, and that any type of endless tractor belt which is suitable for the purpose can be utilized. The detailed description above is merely given by way of complete explanation of the particular structure illustrated and has no limiting effect upon the actual invention.

The improved creeper comprises a base or body member 1, constructed of steel and shaped to fit conformably over and against the tread portion of the particular belt with which it is designed to be used, as will be understood from Figs. 1 and 3. This member is formed adjacent one of its longitudinal edges with a single gripping rib 2 which extends entirely across said member, and adjacent its other longitudinal edge with two short ribs 2' which are spaced from each other as represented in Fig. 2.

To secure the creeper to the belt, two fasteners or lugs 3 are provided, one at each end of the creeper. These lugs are disposed against the inner surface of the tread portion 6' of the belt at opposite sides of the median rib 6⁵, and each of them is formed at its outer end with a tenon 5 which is engaged in an opening or slot 5' in the adjacent end of the base member 1; the said base member 1 and the lugs 3 being clamped together by means of nuts 4' which are screwed over pins or studs 4 fixed to said lugs and projecting through holes 4² in the base 1. The outer faces of the lugs are beveled, as indicated at 3' (Fig. 1) to facilitate their engagement by the supporting, guiding and driving rollers (not shown) usually comprised in the tractor mechanism.

I claim as my invention:—

1. A creeper for an endless track belt of the type which consists of a continuous tread portion provided on its outer face with spaced, longitudinal ground-engaging ribs and on its inner face with a continuous median guide rib; said creeper comprising a base member adapted to extend transversely across the outer face of the tread portion of the belt and to fit conformably over the ground-engaging ribs thereon, ground-gripping ribs on the base member, and means for securing said base member to the said tread portion of the belt.

2. A creeper for an endless track belt, comprising a base member adapted to extend transversely across and fit conformably against the outer surface of the belt, ground-gripping ribs on the base member, clamping lugs adapted to be disposed against the inner surface of the belt directly opposite the base member, and means connecting said lugs and base member together but devoid of engagement with the belt.

3. A creeper, according to claim 2, in which the connecting means comprise threaded studs fixed to the clamping lugs and projecting through holes in the base member, and nuts fitted on the projecting portions of said studs and adapted to be tightened into binding engagement with the adjacent face of said base member.

4. A creeper for an endless track belt, comprising a base member adapted to extend transversely across and fit against the outer surface of the belt and to project beyond the same at opposite ends, said ends having openings therein, ground-gripping ribs on the base member, clamping lugs adapted to be disposed against the inner surface of the belt directly opposite the ends of the base member and having tenons for engagement in said openings, and means separate from said tenons connecting the clamping lugs and the ends of the base member together but devoid of connection with the belt.

5. A creeper for an endless track belt, comprising a base member adapted to extend transversely across and fit against the outer surface of the belt and to project beyond the same at opposite ends, said ends having stud holes therein and slots beyond said holes, ground-gripping ribs on the base member, clamping lugs adapted to be disposed against the inner surface of the belt directly opposite the ends of the base member and having tenons for engagement in said slots, threaded studs fixed to said lugs and projecting through said stud holes, and nuts fitted on the projecting portions of the studs and adapted to be tightened into binding engagement with the adjacent face of the base member.

In testimony whereof I affix my signature.

ADOLPHE KÉGRESSE.